United States Patent [19]

Berger

[11] 4,373,561
[45] Feb. 15, 1983

[54] SUMP OIL DRAINING AND COLLECTING DEVICE

[76] Inventor: Jürgen Berger, Rheingaustr. 115, D-6200 Wiesbaden, Fed. Rep. of Germany

[21] Appl. No.: 174,007

[22] Filed: Jul. 31, 1980

[51] Int. Cl.³ .............................................. B65B 3/04
[52] U.S. Cl. .................................. 141/330; 184/1.5; 215/250
[58] Field of Search ............... 141/311 R, 346–362, 141/382–386, 207, 291–295, 19, 329, 330, 98; 184/1.5, 106; 222/544, 562, 81, 83, 83.5; 220/307, DIG. 13, 265, 267; 137/539; 215/250

[56] References Cited

U.S. PATENT DOCUMENTS

| 619,705 | 2/1899 | Knupp | 137/539 |
|---|---|---|---|
| 1,248,705 | 12/1917 | Pogue | 141/330 |
| 1,559,704 | 11/1925 | Hubbard | 220/307 |
| 1,753,631 | 4/1930 | Walters | 220/307 |
| 2,929,401 | 3/1960 | Cowan | 137/539 |
| 3,032,014 | 5/1962 | Jablonsky | 137/539 |
| 3,033,202 | 5/1962 | Richter et al. | 141/329 |
| 3,219,057 | 11/1965 | Knowles | 137/539 |
| 3,262,599 | 7/1966 | Muller | 220/307 |
| 3,623,628 | 11/1970 | Rericha | 220/307 |
| 3,976,110 | 8/1976 | White | 141/382 |
| 4,173,858 | 11/1979 | Cassin | 141/330 |
| 4,185,747 | 1/1980 | Goncalves | 215/250 |
| 4,202,463 | 5/1980 | Mogler | 220/307 |
| 4,231,544 | 11/1980 | Balch | 184/1.5 |
| 4,269,237 | 5/1981 | Berger | 141/330 |

Primary Examiner—John W. Shepperd
Attorney, Agent, or Firm—Gifford, VanOphem, Sheridan & Sprinkle

[57] ABSTRACT

A device for draining and collecting oil from the sump of a motor comprising a drain spigot and a hose, which are connected to a vessel, and a drain plug having a passage in it, which is closed by a membrane. The membrane is part of a plug-like plastic insert, which can be replaced after rupture of the membrane by the drain spigot. The diameter of the passage and the insert are chosen to fit for all sizes of oil draining plugs of typical motor cars.

7 Claims, 12 Drawing Figures

U.S. Patent  Feb. 15, 1983  Sheet 1 of 4  4,373,561
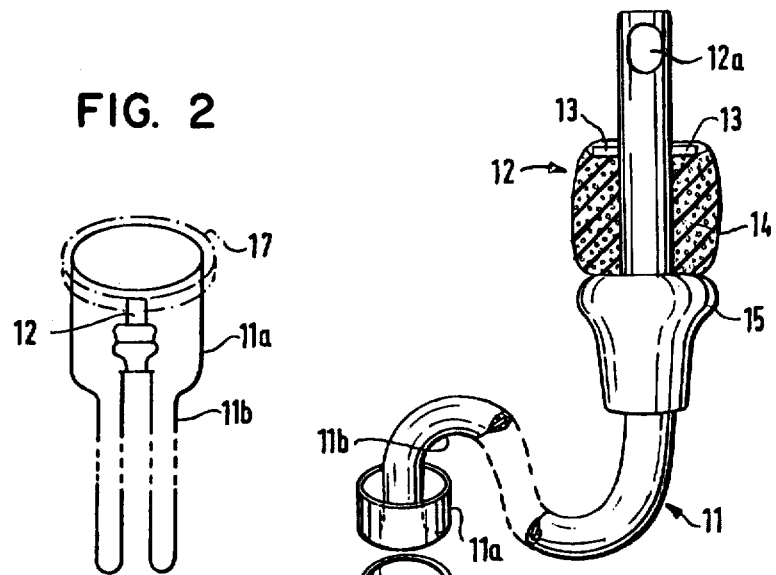
FIG. 2
FIG. 1
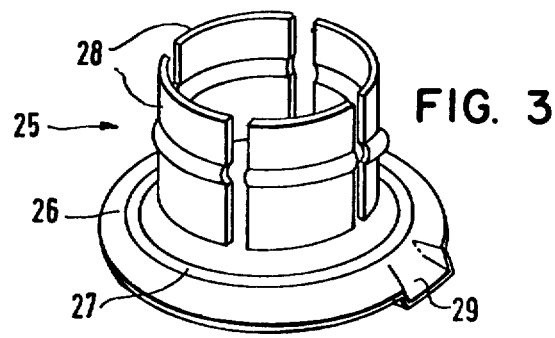
FIG. 3

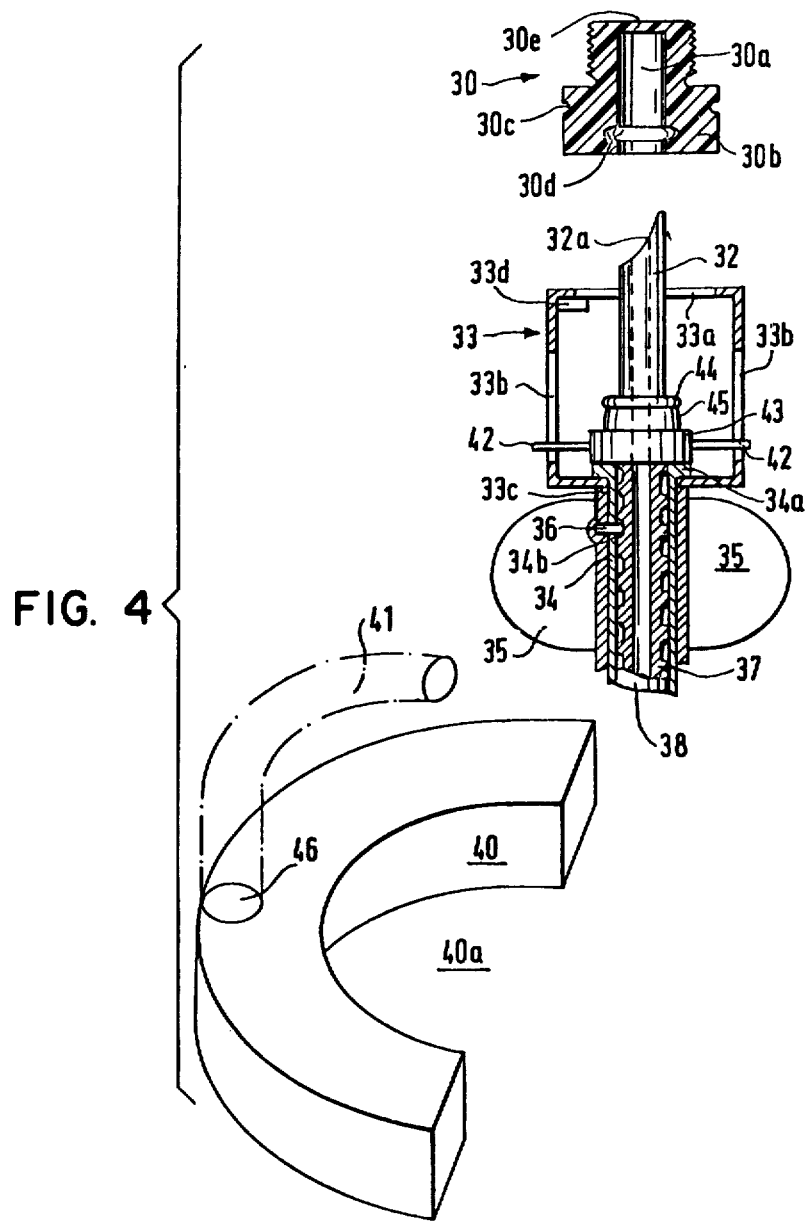

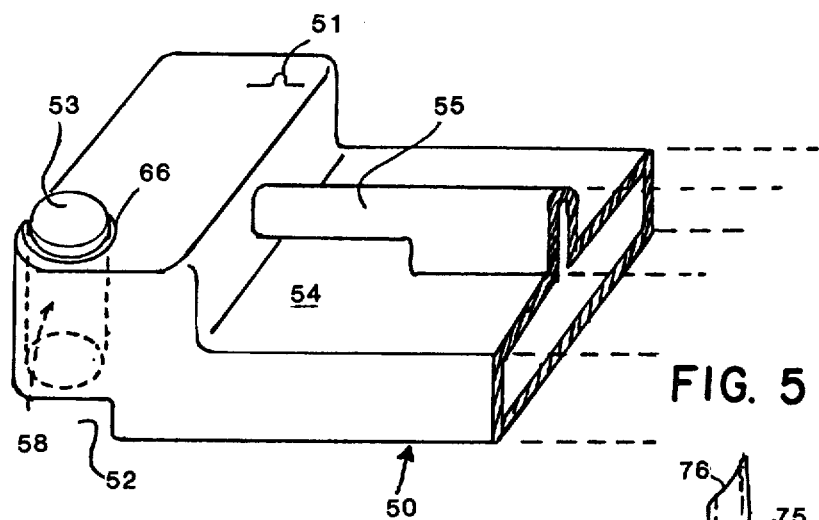
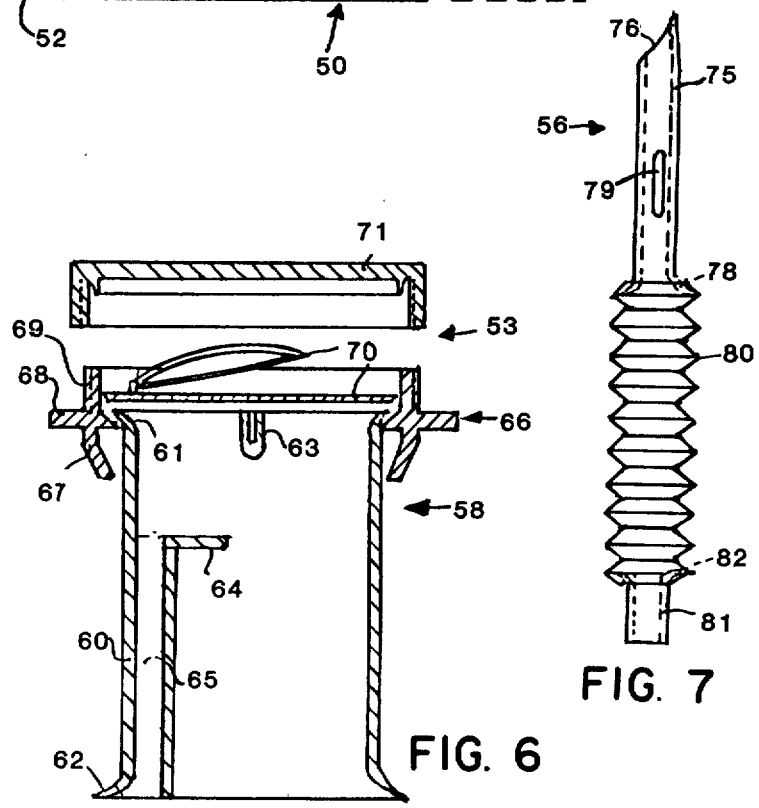

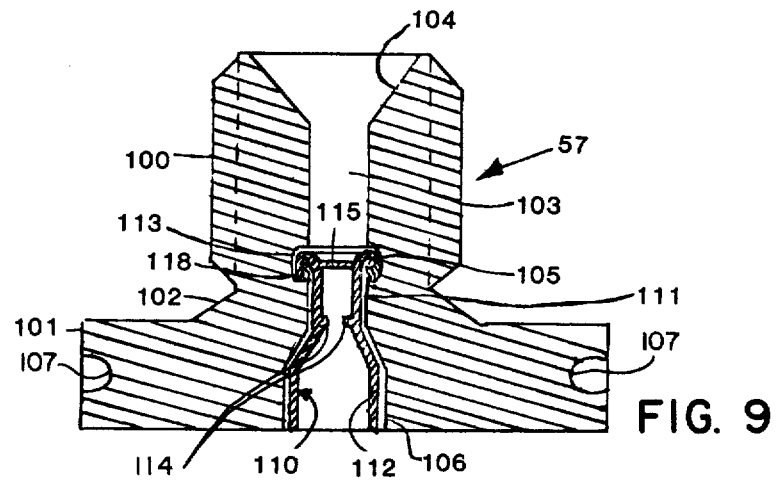
FIG. 9
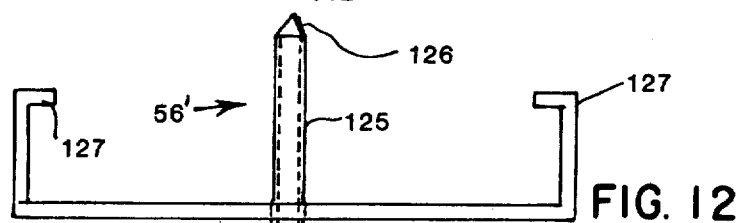
FIG. 12
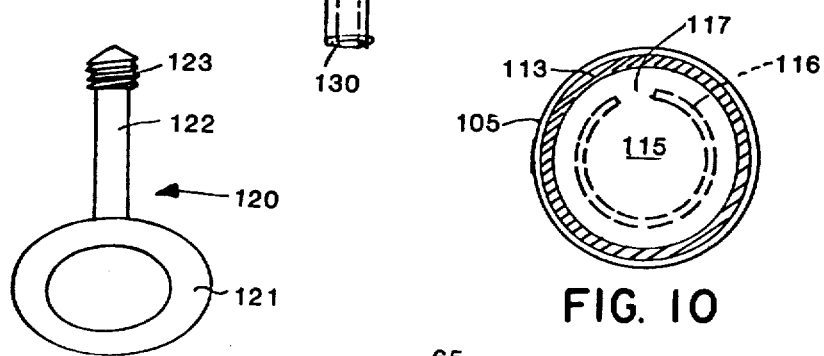
FIG. 10
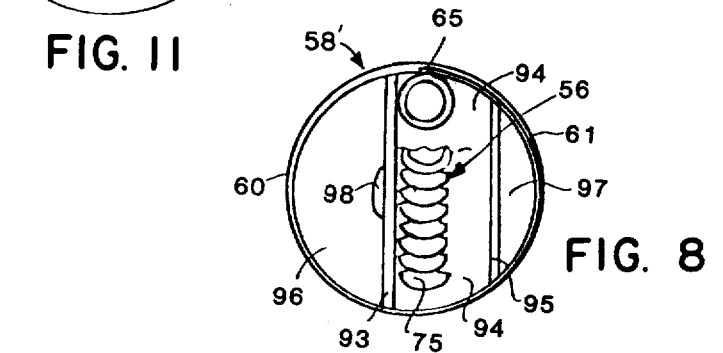
FIG. 11
FIG. 8

4,373,561

SUMP OIL DRAINING AND COLLECTING DEVICE

This application is a continuation in part of co-pending application Ser. No. 967,435 which has now issued as U.S. Pat. No. 4,269,237.

BACKGROUND OF THE INVENTION

This invention relates to a device for draining and collecting oil from motor-vehicle oil sumps.

In garages oil changes are made by draining used old oil out of the oil sump of the vehicle. Garages, which are equipped with elevating platforms for lifting automobiles, have easy access to the oil sump drain plug and also have no difficulty in collecting the old oil.

The motorist, who prefers to carry out his own oil change is, however, faced with considerable difficulties. The automobile first has to be lifted and probably jacked up in order to obtain sufficient ground clearance to place a collecting vessel underneath the oil-sump; an appropriate tool is needed to loosen the oil-drain plug; and care must be taken to fit a new and correct seal for the oil-drain before refilling the sump with fresh oil.

One object of the present invention is to provide an oil-drain and oil collecting device enabling a motorist to carry out an oil change easily and safely, avoiding the danger of oil spillage.

Another object of the present invention is to provide a membrane for closing a drain passage in the drain plug, which membrane can be replaced easily.

SUMMARY OF THE INVENTION

The invention accordingly provides an oil draining and collecting device for draining and collecting oil from a motor-vehicle oil sump, comprising:
  an oil collecting vessel;
  a drain hose;
  a drain spigot having a first and a second end, the first end comprising an edge and the second end being attached to the drain hose;
  a drain plug having a body provided with an oil outlet passage, which is closed by a membrane;
  wherein the spigot is formed for engagement into the oil outlet passage, the first end of the spigot rupturing the membrane thus providing an oil outlet flow from the oil sump through the oil outlet passage, the spigot, and the drain hose into the oil collecting vessel.

The invention also provides an alternative embodiment
  wherein the membrane is formed by a cup-like insert being formed to snap into a catch of the oil outlet passage, the membrane being provided with a predetermined breaking line.

BRIEF DESCRIPTION OF THE DRAWINGS

The invention will be further described, by way of example, with reference to the accompanying drawings, in which:

FIG. 1 shows a spigot connected by a hose to a vessel;

FIG. 2 is a diagrammatic representation of a hose;

FIG. 3 is a perspective view of a dust cap;

FIG. 4 is a diagrammatic representation, partly in section, of a complete device according to a second embodiment of the invention;

FIG. 5 is a perspective view of a vessel forming part of a third embodiment of the invention;

FIG. 6 is a sectional view of a detail, with greater scale, of the device shown in FIG. 5;

FIG. 7 is a side view of the spigot and hose according to the third embodiment of the invention;

FIG. 8 is a top view on a varied detail similar to FIG. 6 of the third embodiment of the invention;

FIG. 9 is a sectional view of a drain plug according to the invention;

FIG. 10 is a top view on a detail in greater scale of the plug according to FIG. 9;

FIG. 11 is a side view of a tool;

FIG. 12 is a side view on a further embodiment of the spigot.

DETAILED DESCRIPTION OF THE ILLUSTRATED EMBODIMENTS

The device for draining an collecting sump oil is shown in FIG. 1 and includes a hose 11 connecting a collecting vessel 10 for the old oil with a drain spigot 12, which is provided near its upper end with a cross bore 12a. The spigot 12 is provided with two outwardly projecting opposed pins 13, a resilient plastic foam sealing element 14, and a hand grip 15. The vessel 10, shown at a reduced scale, is pyramidally shaped having a square base. The apex of the vessel 10 is provided with a cylindrical neck 16 into which a cup-shaped end portion 11a of the hose 11 is inserted, forming a seal. The hose 11 has a flexible portion 11b adjoining and formed integrally with the end portion 11a, which is of larger diameter than the flexible portion.

When the device is not in use, the flexible portion 11b can be turned inside-out and stowed within the vessel 10, see FIG. 2. As may be seen therefrom, the spigot 12 is tucked inside the cup-shaped end portion 11a, which is closed by a removable lid 17. In this way, the collapsed hose 11 is ready for storage.

FIG. 3 shows, on an enlarged scale, the closure cap 25, which can be inserted into the oil outlet passage 30a (FIG. 4) of a drain plug 30. The closure cap 25 is made of a molded plastic material and comprises a flat circular base 26 provided with an annular sealing lip 27 and with a number of resilient cylindrical segments 28 depending upwardly from the base 26. The segments 28 are snap-engaged in the passage 30a of the plug 30 to seal the open lower end of the passage against ingress of dirt. The edge of the base 26 is formed with one or more notches 29, into which a screw driver or like tool can be inserted to disengage the cap 25 from the plug 30.

Referring to FIG. 4, the drain plug 30 consists of a molded plastic body including the oil outlet passage 30a and having an external screw-thread for engagement in a threaded hole in the base of a sump and an integral hexagonal head 30b. An external annular groove 30c is formed in the head 30b and an internal annular groove 30d is formed in the passage 30a. The passage 30a is closed at its inner end by a membrane 30e moulded integrally with the body of the plug 30. The oil drain passage 30a, therefore, normally is closed and the plug 30 seals the normal drain hole in the base of the oil sump.

In order to drain the sump, the membrane 30e is ruptured by means of a tubular drain spigot, for example as shown at 32. The spigot 32, at its free end, has a cutting edge 32a, which tapers to a point, so that viewed laterally, the cutting edge has a parabolic shape. This avoids the possibility of the inner open end of the spigot 32 being blocked by the membrane 30e after the latter has been ruptured and tilted upwardly by insertion of the spigot 32 into the passage 30a.

The embodiment of FIG. 4 additionally shows a device for rotating the spigot 32 about its axis. This device comprises a support cage 33, a tubular ferrule 34, a handle 35, a pin 36 and a hollow spindle 37. The support cage 33 surrounds the spigot 32 and has at its free end a hexagonal aperture 33a corresponding inside to the hexagonal head 30b. Two longitudinal guide slots 33b are formed in the sides of the cage 33 and a circular opening 33c is provided at the end opposite the aperture 33a for fitting the cage 33 to the tubular ferrule 34, which surrounds one end of a drain hose 41. The ferrule 34 has an external flange 34a and a lateral hole 34b, through which the pin 36 passes. Handle 35 is attached to and fits over the ferrule 34. The hollow spindle 37 connects the drain spigot with one end of the hose 41, and fits inside the end of the hose 41 which is surrounded by the ferrule 34. A collar 43 is formed at the end of the spindle 37 and has two transverse pins 42, which engage the slots 33b of the support cage 33. The pin 36 engages in a helical groove 37a formed in the surface of the spindle 37. Upon rotation of the handle 35, therefore, the spindle 37 is confined to movement longitudinally relative to the spigot 32, and is unable to rotate. By rotating the handle 35 the ferrule 34 together with the pin 36 is rotated, and causes axial displacement of the spindle 37 and the spigot 32 relative to the cage 33, the spindle 37 being prevented from rotating by the engagement of the pins 42 in the slots 33b of the cage 33.

To penetrate the membrane 30e of the plug body 30, the spigot 32 is first inserted into the bore 30a and, the support cage 33 is fitted over the hexagonal head 30b until a lip defining the edge of the hexagonal aperture 33a snaps into the groove 30c and is locked therein. A stop 33d is formed on the support cage 33 and bears against the hexagonal head 30b, when the cage 33 has been fitted correctly. With the support cage 33 locked to the plug body 30 in this way, the handle 35 is rotated, causing the hollow spindle 37 together with drain spigot 32 to be displaced axially by the engagement of the pin 36 in the helical groove in the spindle 37, so that the cutting edge 32a penetrates the membrane 30e. By turning the handle 35 in the opposite direction, the connection can be disengaged. A rubber sealing ring 44 and a collar 45 provide a seal between the spigot 32 and the wall of the bore 30a.

The drain hose 41 leads into a horseshoe-shaped vessel 40. This shape of vessel has the advantage of affording a clear working space 40a beneath the vehicle when carrying out an oil change with restricted headroom. A screw connection 46 is provided for connecting the hose 41 to a central part of the U-shaped vessel 40. This screw connection also serves as a discharge outlet when disconnected from the vessel 40. Other U-shaped configurations for the vessel, including shapes with straight or angular sides, may be adopted.

The pyramid-shaped oil collecting vessel 10 shown in FIG. 1 may be used to form an octahedral structure by adding a second pyramid-shaped vessel 10, with the bases of the pyramids laid on top of one another and interconnected by, for example, an elastic band. The second vessel may serve as a reserve oil container, so that the two vessels are of a size and shape such that they can easily be accommodated in the trunk of an automobile. One of the vessels 10 would be empty and ready to collect the old oil drained from the sump, as described previously, whilst the other vessel would contain fresh oil and could later also be used for the collection of old oil. Once both vessels had been filled with old oil the motorist would be forced to dispose of the old oil thus collected in order to empty one of the vessels for replenishment with a supply of fresh oil.

Referring to FIG. 5, there is shown another vessel 50 having essentially a long, flat square shape and is firstly used to take up fresh oil and, after consumption thereof, to collect the old oil. A multiplicity of vessels 50 can be stacked one upon the other and, have antislide means 31 such as naps and notches formed within the walls of the vessel. Within the general periphery of the vessel, one corner has a recess 52, which is big enough to take up a screw cover 53 of the vessel beneath. The vessel 50 has a further recess 54 to take up a handle 55. The recess 54 offers space to take up a spigot 56 (FIG. 7) and a drain plug 57 (FIG. 9).

FIG. 6 shows the details of the screw cover 53 and of a spout means 58. The latter comprises a tube-like body 60 having an upper flange 61, a lower flange 62, a gripping rail 63, a transverse wall 64 and a small tube 65. The gripping rail 63 crosses through the interior of the tube 60 in the area of the largest diameter. The transverse wall 64 is situated 2/3 of the height of the tube-like body 60 and extends nearly across the larger diameter thereof. The wall of the small tube 65 extends from the wall of the tube-like body 60, that is, the interior of the small tube 65 extends in a direction parallel to the wall of the tube 60 and passes through the transversal wall 64.

The tube-like body 60 is surrounded by a ring-like body 66 comprising a sealing cone 67, a flange 68, a threaded neck 69 and a rupture-membrane 70. The cone 67 is sealingly pressed into a hole of the vessel 50, the flange 68 abutting at the surface of the vessel 50 (not shown). The flange 68 extends radially inwardly to engage the flange 61 of the tube-like body 60. The inner diameter of the flange 68 corresponds to the outer diameter of the tube-like body 60, such that these parts can be moved in an axial direction as soon as the membrane 70 is removed. In such a case, the tube-like body 60 can be gripped at the rail 63 and pulled upwardly until the flange 62 abuts at the inner lip of the flange 68. Clearly the tube-like body 60 can be pushed back into the position shown in FIG. 6.

Instead of the membrane 70 or additionally thereto a screw cap 71 can be provided.

FIG. 7 shows the details of the spigot 56. It is made from thin tube stock 75, preferably of metal and being 5 to 10 cm long. A parabolic edge 76 is formed at the one end of the tube 75, the other end thereof being formed to a flange 78. A grip extension 70 can be provided at the outer surface of the tube. A bellows-like hose 80 has one end fixed to the flange 78 of the tube 75. The other end of the hose 80 surrounds a flange 82 of a short tube 81, the outer diameter thereof fitting to the inner diameter of the small tube 65, such that the spigot 56 can be connected to the small tube 65, when the membrane 70 has been removed.

Referring to FIG. 8, a modified spigot means 58' is shown in a view from above, the spigot 56 being already connected to the tube 65. In lieu of the transverse wall 64, a bottom wall 94 is provided near the flange 62, and is limited by two walls 93, 95 extending in axial direction through the interior of the tube-like body 60 between both flanges 61 and 62. By this way, a bigger oil drain-passage 96 and a smaller air-passage 97 are formed. A gripping means 98 is provided at the wall 93 and can be formed as a recess therein or a protrusion thereon. By engagement of one or more fingers, the tube-like body 60 can be moved relatively to the ring collar 66. The embodiment described has the advantage that the spigot 56 can be coupled to the tube 65 in the workshop and can be distributed in this state.

Referring to FIG. 9, the preferred embodiment of an oil drain plug 57 is shown. As usual, the oil drain plug has a thread portion 100, a hexagonal head portion 101 and a cone 102. The outer dimensioning of the plug 57 corresponds to the dimensioning of the usual plug, which is to be replaced. However, there is a oil outlet passage 103 beginning by a cone 104 and having a ring groove 105 at its mid-point. The lower end of the passage 103 can be widened out as shown at 106. At the periphery of the head portion 101, a ring groove 107 or portions of such a ring groove can be provided.

Within the oil outlet passage 103 a plastic cup 110 is provided having a bottle-like shape with neck 111 and funnel-like body 112. A ring collar 113 is provided at the upper end of the neck 111 and one or more inner rips 114 are provided at the lower end of the neck. The cup 110 has a membrane 115, which is surrounded by the ring collar 113 and has a predetermined breaking line 116 (FIG. 10) forming an open ring. The predetermined breaking line 116 can be formed by a small groove in the membrane. As shown, the breaking line is not closed, but has a web 117 used as a hinge, when the membrane 105 is ruptured and the portion within the breaking line 116 opens like a cover. This is effected by the spigot entering the passage 103 from below.

For assembly, the plastic cup 110 is pressed into the passage 103 from below, the collar 113 snapping into the groove 105. A sealing ring 118 can be provided adjacent the collar 113, the material of the sealing ring being known in auto motor construction and becoming tacky in the presence of oil.

The oil draining and collecting device according to invention is used as follows: After unscrewing the cover 71 the membrane 70 is removed and the new oil, which is in the vessel, can be poured in the oil sump of the engine. When the vessel 50 is emptied, it is prepared to take up old oil. To that end the spigot 56 and the hose 80 with its end 81 is plugged into the tube 65 of the spout 58 and the tube-like body 60 is lifted by gripping the rail 63 such that the leading end of the spigot 56 fits into the oil passage 103 of the plug 57. The plug 57 commonly is at the lowest point of the oil sump of the vehicle, and the distance between plug and street surface usually is different for the different vehicles. Due to the fact that the tube-like body 60 can be lifted to a greater and lesser extent, and the spigot 56 can be extended by the bellows-like hose 80 or shortened by bending same, the differences in the referred to distances can be overcome. When the edge 76 hits the breaking line 116, the membrane 115 is ruptured and is tilted up like a cover, the remaining bridge 117 operating as a hinge. The handle 79 can be used as a stop at the lower side of the head 101. The diameter of the breaking line 116 is such that the edge formed by the opening in the membrane is pressed against the outer periphery of the spigot 56 as to seal same. To that end, the spigot 56 can show a slight cone at its leading end near the edge 76. Oil within the oil outlet passage 103, therefore, is vented only through the interior of the spigot 56, the hose 80 and the tube 65 into the vessel 50.

The device for draining and collecting oil, therefore, combines the distribution of new oil with the recycling of old oil without the danger of spilling. It is possible to couple, in a pledge system, selling of new oil with the transfer of the old oil.

Before filling in new oil into the oil sump, the plastic cup 110 must be replaced by a new one. FIG. 1 shows a pulling tool 120 having a handle 121 and a rod 122, the end thereof being formed as a screw 123. The screw 123 is turned into the rip 114 of the plastics cup 110, such that the latter can be torn out of its catch at 105. The rip 114 can be arranged as a thread or of portions of a thread, which the screw 121 fits in. It is also possible to use a cutting screw 123, which is able to cut its holding thread itself.

As soon as the oil outlet passage 103 is cleared, a new plastic cup 110 can be inserted. It is sufficient to press against the cup 110 from below with a flat member.

FIG. 12 shows a spigot 56', which is varied to be used in a garage. The spigot 56' consists of a tube 125 the leading end thereof being bridged over by a cutting curved piece of metal 126. This metal piece 126 can be soldered by its end to the tube 125, it is also possible to use a wall portion of the tube 125 itself, similary to FIG. 1 and FIG. 7. The spigot 56' is provided with one or more gripping members 127 latching into the groove 107 or the head 101 thus providing a means for holding the spigot and a hose 130 at the drain plug 57, also when there is a mechanical tension, which is present when the hose 130 is a longer one and leading to the usual old oil vessel of a garage.

It is known that the sizes and dimensionings of oil plugs are different on different vehicle types of the numerous producers; in order that one and the same size of plastic cup 110 can be used with a different type of oil plug, the oil outlet passage 113 has the same diameter in all cases. At present, polytetrafluorethylene is preferred as the material for the cup 110; however, other oil resistant plastics can be used.

For latching the plastic cup 110 has a collar 113 and the passage 103 has a groove 105; however it is possible to use a reversed locking means consisting of a rip within the passage 103 and a groove within the cup 110.

The rip 114 is shown as a ring, however, it is also possible to use separated rip pieces within the neck 111 which extend in axial direction. Also in this case the cutting screw 123 anchors itself in the rips such that the plastics cup 110 can be pulled out of the passage 103.

The invention can be used also in connection with oil sump plugs of boats and similar vehicles. In any case, the invention facilitates the clean oil change without the danger of spilling old oil.

What is claimed is:

1. A device for draining and collecting oil from motor vehicle oil sumps comprising:
   an oil collecting vessel;
   a drain hose;
   a drain spigot having a first and a second end, the first end comprising an edge and the second end being attached to the drain hose;
   a drain plug having a body provided with oil outlet passage, which is closed by a membrane;
   wherein the spigot is formed for engagement into the oil outlet passage, the first end of the spigot being capable of rupturing the membrane thus providing an oil outlet flow from the oil sump through the oil outlet passage, the spigot, the drain hose into the oil collecting vessel;

wherein the membrane is formed by a plastic cup and further comprising means for locking said cup in said oil outlet passage; and wherein said plastic cup has a ring collar surrounding said membrane, and wherein said oil outlet passage has a ring groove, said ring groove and said ring collar being formed as to engage in a snapping action.

2. The device according to claim 1, wherein said drain hose is a bellows.

3. The device according to claim 1, wherein said oil collecting vessel has an opening and a means for shutting said opening, said shutting means comprising
a cover,
a ring collar, wherein that ring collar is pressed into said opening of said oil collecting vessel and a tube-like body, said tube-like body being inserted within said ring collar and having two flanges to cooperate with said ring collar, said tube-like body also having wall means adapted for attachment of said drain hose.

4. The device according to claim 1, wherein said membrane is provided with a breaking line.

5. The device according to claim 4, wherein said breaking line is formed as an open ring leaving a bridge.

6. The device according to claim 1, wherein said plastic cup has an outer shape of a bottle including a neck and a funnel-like body.

7. The device according to claim 1, wherein said plastic cup has rip means extending inwardly.

* * * * *